Oct. 22, 1957  A. VAN RYAN  2,810,804
CIRCUIT INTERRUPTER

Filed March 6, 1956  3 Sheets-Sheet 1

INVENTOR.
Anthony Van Ryan
BY
Ralph G. Hohenfeldt
Attorney

Oct. 22, 1957 A. VAN RYAN 2,810,804
CIRCUIT INTERRUPTER
Filed March 6, 1956 3 Sheets-Sheet 2
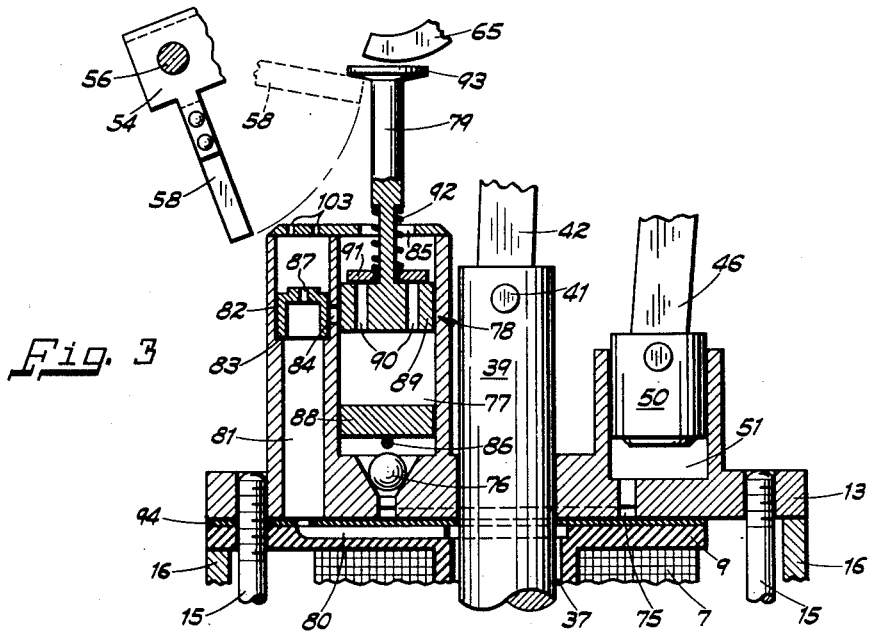
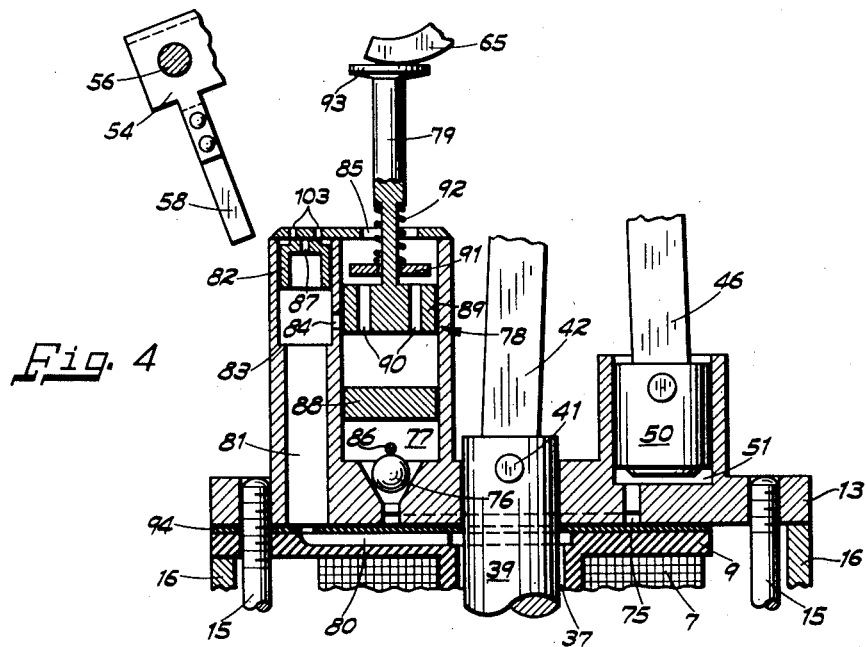
INVENTOR.
Anthony Van Ryan
BY Ralph L. Hohenfeldt
Attorney Oct. 22, 1957  A. VAN RYAN  2,810,804
CIRCUIT INTERRUPTER
Filed March 6, 1956  3 Sheets-Sheet 3

INVENTOR.
Anthony Van Ryan
BY
Ralph D. Hohenfeldt
Attorney

United States Patent Office 2,810,804
Patented Oct. 22, 1957

2,810,804

CIRCUIT INTERRUPTER

Anthony Van Ryan, Ocean Springs, Miss., assignor to McGraw-Edison Company, a corporation of Delaware Application March 6, 1956, Serial No. 569,828

8 Claims. (Cl. 200—89)

This invention relates to improvements in automatic reclosing circuit interrupters. The invention is particularly directed to a circuit interrupter which is adapted to be placed in a distribution system supplying one or more sectionalized branch lines.

Conventional reclosing type circuit interrupters have been designed to protect power distribution lines by responding to currents in excess of their minimum trip setting with a plurality of successive opening and closing operations. Generally the first one or two of the opening operations are fast, that is, there is a short time lapse between the start of flow of excessive current and opening the contacts of the recloser. Subsequent opening operations are usually retarded, thereby permitting greater time lapse between the start of flow of excessive current and opening of the contacts. Since most faults are of a temporary nature they usually are cleared during the time interval between opening and reclosing, thereby enabling the interrupter to re-establish normal circuit continuity. After a predetermined number of opening and closing operations have been executed, some form of integrating device acts to automatically trip the circuit interrupter to full open position if the fault is not cleared, whereupon it locks out until manually reset. During the period of interrupter inactivity following automatic lockout, the integrating device settles back to its normal position and thus prepares itself for a repetition of the opening and reclosing sequence just described.

For a more complete description of a conventional, well-known type of circuit interrupter having the above characteristics, reference may be made to U. S. Patent No. 2,560,529 issued to Van Ryan et al. on July 10, 1951, and assigned to the assignee of the instant invention.

Those versed in the art will appreciate that after a circuit interrupter has been locked open for an extended period of time, the load which it protects will have lost its diversity. In other words, after an extended outage nearly all of the electric power consuming appliances on lines protected by the circuit interrupter will be demanding electrical energy. This situation will cause high inrush currents to flow immediately after manually resetting and the conventional interrupter will respond as it does when excess currents are flowing due to a faulted line, that is by executing one or more fast opening operations followed by retarded opening operations. This is so because most prior art circuit interrupters repeat the same sequence of fast and retarded operations after manual resetting that they executed prior to lockout.

It is at once obvious that it would be highly advantageous for the reclosing circuit interrupter to be impressed with the ability of executing only retarded operations while it is trying to cope with the high initial inrush current subsequent to manual reclosing. Under these circumstances there would be sufficient time delay, while the interrupter is preparing to execute a retarded operation, for motors on the branch lines to attain near normal speed and accordingly normal current consumption. The same being true of other appliances on the line to a large extent, the high transient inrush current soon subsides to near normal values which may be easily handled by a circuit interrupter of the proper protective rating.

It is an object of this invention to overcome the above indicated problems by providing a reclosing circuit interrupter which is capable of executing a pre-determined sequence of fast and retarded opening operations prior to lockout, and with a plurality of retarded operations only following lockout and manual resetting, so as to avoid the fast response to excessive currents of a transient nature.

A further object is to provide a circuit interrupter which executes a plurality of retarded operations subsequent to manual resetting as aforesaid and then after current conditions have returned to normal in the circuit, resets itself for the usual sequence of fast and retarded operations.

Yet another object is to accomplish the foregoing objects by hydraulic means taking advantage of the dielectric fluid in which the interrupter is immersed and generally improving the hydraulic timing elements now found in conventional circuit interrupters.

Accomplishment of these and other more specific objects will be evident from time to time throughout the specification.

Embodiments of the invention are shown in the accompanying drawings in which:

Fig. 3 is an enlarged sectional view, with parts broken away, of elements comprising the hydraulic timing mechanism of the recloser depicted in the previous figures, the various parts being shown as they are disposed immediately after manually resetting the interrupter following a prolonged lockout;

Fig. 4 is similar to Fig. 3 but shows the arrangement of the parts as they appear after the interrupter has executed a retarded operation subsequent to lockout and manual resetting;

Supplementary information relative to conventional circuit interrupters may be obtained from the aforementioned Van Ryan patent and U. S. Patent No. 2,710,895 issued June 14, 1955, to R. S. Fredrickson, assigned to the assignee of this invention. A suitable sectionalizing switch for use in conjunction with the instant circuit interrupter is illustrated in U. S. Patent 2,515,530 issued July 18, 1950, to Carl Schindler and assigned to the assignee of this invention.

Figure 1:
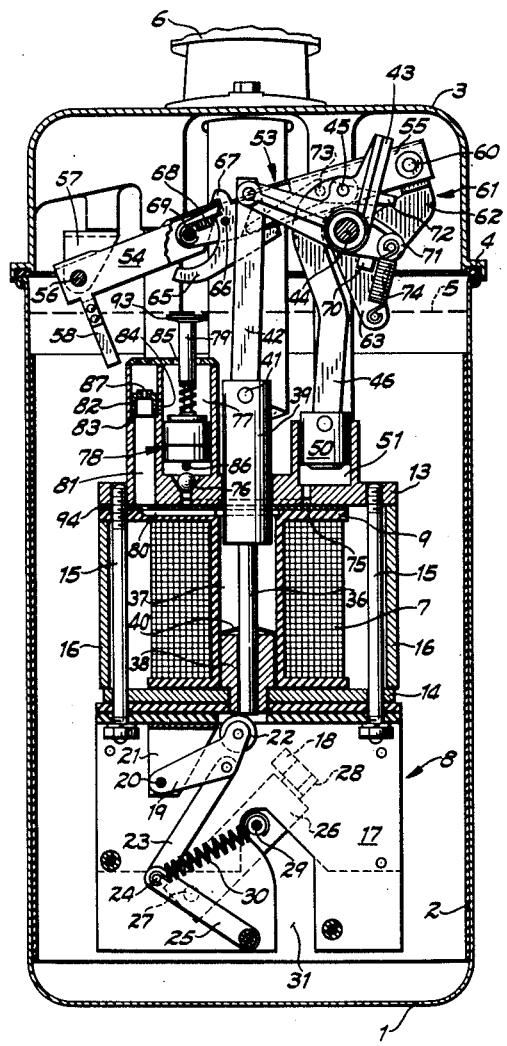
Fig. 1 is a vertical sectional view, partly broken away, through the circuit interrupter showing it in closed circuit position.

In Fig. 1, where the circuit interrupter is shown in its normal conductive condition, it is seen to comprise a metallic tank 1 which is preferably provided with an interior insulating liner 2 throughout a major portion of its axial length. The tank 1 has a metal cap or cover 3 detachably secured thereto by means of bolts, not shown. An annular gasket 4 provides a water-tight seal between cover 3 and tank 1.

The entire mechanism of the circuit interrupter is suspended from the cover 3 and its major portion is immersed in dielectric oil to the level indicated by the dashed line 5. Further details regarding suspension of the circuit interrupter mechanism from the cover may be seen in the cited Van Ryan patent.

The circuit interrupter here under discussion is of the series coil type. That is, current is led in through an insulating bushing 6 to a series solenoid operating coil 7 from which it flows to a series contact assembly 8 and out through a similar bushing. It is thus seen that the same current flowing in the power line being protected by the interrupter traverses the series coil 7 and contact assembly 8. It is customary that the series operating coil become effective in response to current values twice the normal current rating of the interrupter.

Series solenoid coil 7 is wound on an insulating spool 9 which is tightly clamped between an upper magnetic frame 13 and a lower magnetic frame 14 by means of tie bolts 15 juxtaposed to vertical magnetic spacer members 16. Hence, solenoid coil 7 is completely surrounded by a low reluctance magnetic path.

The interrupter contact assembly, designated generally by the reference numeral 8 is shown supported by means of bolts 15 in insulated relation from lower magnetic member 14. The assembly comprises two spaced insulating walls 17, of "Bakelite" or similar material, upon which are mounted a pair of stationary wiping contacts 18. Remaining elements of the contact assembly constitute movable snap acting mechanism and include a roller lever 19 pivotally mounted on a pin 20 fixedly supported by a bracket 21. Roller arm 19 carries a journaled roller wheel 22 which is adapted to swing arm 19 in a clockwise direction responsive to radial forces applied on the outer periphery of the roller wheel. Roller arm 19 is also pivotally attached to link 23 which is in turn pivoted at 24 to a second link 25. The second link is also supported on a fixed pivot carried by one of the insulating walls 17 of the contact assembly 8. A movable contact lever 26 is fixedly pivoted at 27 to provide a rotational center for movable contact 28. There are actually a pair of such movable contact levers 26 laterally spaced from each other and interconnected to form an electrical bridge by means of a conductive cross-pin 29. A toggle spring 30 is attached intermediate the ends of the cross-pin 29 and to pivot pin 24 which joins links 23 and 25 together.

It will be observed in Fig. 1 that when the contact is in closed circuit position the line of action of spring 30 lies above movable contact lever pivot 27. However, when a radial force is exerted downwardly on roller arm 19, pivot 24 is forced to a position where it causes the line of action of spring 30 to pass below movable contact lever pivot 27. Upon this event, spring 30 expends its stored energy by rapidly rotating contact lever 26 in a clockwise direction with a snap action, thereby opening the contacts very rapidly. An appropriate vertical slot 31 is provided for the purpose of permitting bridging cross-pin 29 to swing its associated movable contact levers 26 on the outside of insulating walls 17. When the operating force is removed from roller 22, roller arm 19 and links 23 and 25 will return to their original position after which movable contact lever 26 will return to its closed circuit position of Fig. 1 under the influence of toggle spring 30.

Figure 2:
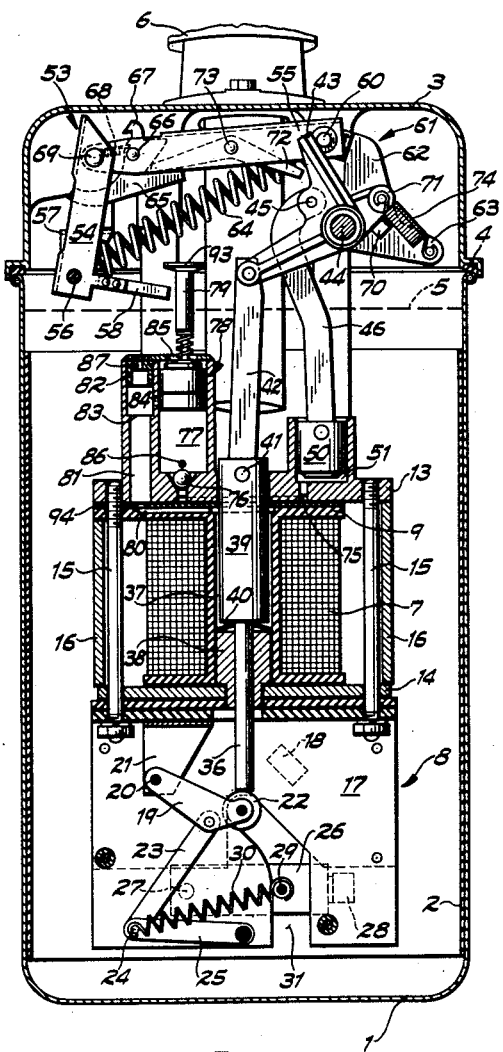
Fig. 2 is a similar view showing the recloser immediately after automatic lockout.

It is evident from inspecting Figs. 1 and 2 that the contact mechanism just described is actuated by vertical reciprocation of a plunger extension rod 36 coaxial with a cylindrical chamber 37 in the solenoid coil spool 9. Extension rod 36 passes through an apertured plug 38 fairly tightly or at least closely enough so that there is no appreciable leakage of fluid around the rod 36.

Comparing Figs. 1 and 2 it will be seen that there is a main magnetic plunger 39 adapted to move in cylinder chamber 37 in accordance with magnetic force developed by coil 7. At the bottom of cylinder 37 is a cup washer 40 as shown as illustrative of a way to absorb the impact of downwardly moving plunger 39. When plunger 39 is attracted downwardly by the magnetic influence of series solenoid coil 7 as in Fig. 2, the fluid trapped underneath the plunger is displaced and discharged longitudinally upwardly, the plunger fitting rather loosely in cylinder 37 for the purpose of providing a passageway for the discharge of said fluid. The purpose of this pumping action in response to flow of excess current through series solenoid coil 7 will be described more fully hereinafter.

Referring further to Figs. 1 and 2 it will be seen that the plunger 39 is attached by means of a pivot pin 41 to an insulating link 42 in turn pivoted at one end to an L-shaped bell crank 43. Bell crank 43 is loosely journaled on a main shaft 44 in such manner that plunger 39 may freely reciprocate without exerting any rotational influence on shaft 44.

Bell crank 43 also has pivoted to it at 45 a curved link 46 extending down to a pumping piston 50 which cooperates with a tightly fitting cylinder 51 cast integrally with upper magnetic member 13. Although not shown here, reference to the cited Van Ryan patent will reveal that pumping piston 50 is provided with a suitable interior check valve assembly which permits pumping oil on a downward stroke of piston 50 and drawing oil into the cylinder 51 on its upward stroke. Piston 50 and magnetic plunger 39 reciprocate in the same direction so that they pump fluid simultaneously when the interrupter responds to overloads.

It will be observed in Fig. 1 that when series coil 7 is conducting less than the minimum tripping current, plunger 39 is restrained in its uppermost position by contact toggle spring 30 exerting an upward force on extension rod 36 in opposition to any magnetic force which is developed by coil 7 on plunger 39 under normal load current conditions. In Fig. 2, however, the minimum tripping current of the solenoid coil has been exceeded, thereby developing sufficient magnetic attraction to pull plunger 39 downwardly and overcome the force of spring 30 whereupon the contacts 28 and 18 are opened.

For the purpose of locking out the circuit interrupter subsequent to a pre-determined number of contact operations a toggle link mechanism 53 is provided. The mechanism comprises two relatively pivotable channel shaped links 54 and 55 which are partially nested within each other when in their position of Fig. 1. Shorter toggle link 54 is supported for rotation on fixed pivot 56 carried on a bracket 57 affixed to recloser cover 3. Link 54 also has affixed to it an integrating piston restraining arm 58 which extends from the link at right angles and swings therewith. The reason for the restraining arm will be set forth below.

Toggle link 55 is pivotally attached by a laterally extending pin 60 to a lever 61 including a pair of arms designated 62 and 63, respectively. Double armed lever 61 is loosely journaled on main shaft 44. A lockout spring 64 is interposed between fixed pivot 56 at one end of toggle link 54 and rectilinearly movable lateral pivot pin 60 attached to double armed lever 5. When in the position illustrated in Fig. 1, links 54 and 55 are prevented from collapsing toward each other under the influence of lockout spring 64 by means of a latch 65 pivotally carried at 66 on toggle link 55. It will be observed that the latch 65 has a hooked portion 67 which overhangs the top of channel shaped toggle link 54, thus locking the two links together. Latch 65 is held in latching relation by means of a latching spring 68 connected at one end to latch 65 and at its other end to an anchor pin 69 constituting the pivotal connection between the two toggle links. Latch 65 also has a curved portion extending below toggle link 54 so that rotational force exerted on the curved portion will cause rotation of the latch and release of its hooked end 67 from the toggle link. Thereupon the two adjacent links 54 and 55 will be detached from each other so that they may be collapsed as in Fig. 2 under the influence of lockout spring 64.

It will be noted that doubled arm lever 61 is provided with a protuberance 70 which extends into the swinging path of a short lever 71 which is rigidly affixed on shaft 44 for rotation therewith. In the event that doubled arm lever 61 rotates from its position in Fig. 1 to its counterclockwise position of Fig. 2, protuberance 70 exerts a radial rotational force on rigid arm 71 thereby causing shaft 44 to rotate accordingly.

Although not shown in the drawings, shaft 44 has attached to an end exterior of the recloser cover 3, a manual operating handle which rotates in accordance with the shaft 44 and short lever 71. The exact character of the operating handle is not essential to understanding the instant disclosure, but may be seen in the cited patents.

In Fig. 2 it will be noted that pin 60, which ties channel toggle link 55 and doubled arm lever 61 together, extends laterally into the path of bell crank 43. Thus when the toggle collapses as in Fig. 2, pin 60 strikes the bell crank as shown and causes the latter to rotate counterclockwise thereby forcing magnetic plunger 39 downwardly and permanently opening the contacts as described above.

For manual lockout of the interrupter, short rigid arm 71 is intentionally rotated from its position in Fig. 1 by means of the manual handle, not shown. It will be observed that arm 71 will strike the end of a tripping lever 72 pivotally carried at 73 inside of the long channeled toggle link 55. A portion of trip lever 72 extends into contact with an extension on latch 65 so that counterclockwise rotation of the trip lever will cause clockwise rotation of the latch 65 whereupon its hooked end 67 will be released from short link 54 for permitting the toggle to collapse as in Fig. 2.

A small tension spring 74 holds lever 71 in a fixed position with respect to protuberance 70.

If it is desired to restore the toggle assembly 53, pump 50 and plunger 39 from their positions in Fig. 2 to those in Fig. 1, it is merely necessary to rotate main shaft 44 in a clockwise direction by means of its exterior operating handle, not shown. By this action, lever 71 will exert a force on protuberance 70 so that it will, through intermediate double armed lever 61, align toggle links 54 and 55 with respect to each other and reset latch 65 as in Fig. 1.

From the structure thus far described it is evident that the recloser may be tripped open automatically by a force on latch 65 or manually by rotation of shaft 44. It is also to be appreciated that toggle mechanism 53 cannot be reset except by manual means. Moreover, it may be restated that plunger 39 simultaneously executes a pumping and contact opening action in response to the flow of current of a pre-determined magnitude through solenoid coil 7. In addition it is also seen that piston 50 pumps a definite quantity of oil each time magnetic plunger 39 executes a downward stroke.

Attention is now turned to the manner in which the novel recloser integrates a first series of fast and retarded contact opening operations resulting in lockout, and thereafter, upon manual resetting, proceeds to go through a second series of one or more retarded operations. As explained before, each time plunger 39 descends to open main contacts 18 and 28, pump piston 50 simultaneously displaces a quantity of oil from cylinder 51. Grooved passageway 75, in upper magnetic frame member 13, concentric with plunger 39, transmits the oil so displaced by the pump piston 50 through a ball valve 76 and into cylinder 77 underneath a two section counting or integrating piston 78 which is adapted to be lifted in a step-by-step manner. During the first series of contact opening operations, pump piston 50 delivers a sufficient quantity of oil into counting piston cylinder 77 for raising the latter unitarily from its position in Fig. 1 to its uppermost position in Fig. 2. It will be noted that counting or integrating piston 78 has extending upwardly from it a trip-out stem 79 normally extending in the direction of toggle latch 65. When the stem 79 strikes latch 65 the toggle 53 collapses in the manner shown in Fig. 2. Upon this event lateral pin 60, carried by double armed lever 61, rotates counterclockwise and strikes bell crank lever 43 and causes the magnetic plunger 39 to be restrained in its lowermost position under the influence of lockout spring 64 and gravity. The recloser will remain in this condition until manually reset.

Each time that pump piston 50 delivers a measured quantity of oil underneath trip piston 78, magnetic plunger 39 likewise displaces oil from its cylinder 37. Plunger 39 fits rather loosely in cylinder 37 so that oil displaced from underneath the plunger may flow upwardly axially of the plunger and into a passageway 80 which leads to a slide valve cylinder 81. Passageway 80 is defined by the flanges on coil spool 9 and a gasket 94 interposed between spool 9 and upper magnetic member 13. Slide valve 82 is a lightweight cylindrical valve which normally rests on an annular shoulder 83 within slide valve cylinder 81. Each time magnetic plunger 39 forces oil into the slide valve cylinder, the slide valve is forced upwardly from its position in Fig. 1 to that in Fig. 2. At the conclusion of each stroke of magnetic plunger 39 slide valve 82 returns to its lowermost position on shoulder 83. Each time plunger 39 descends during the fast operations in the first series, part of the oil which it displaces elevates slide valve 82 and the remaining portion is discharged through an escape orifice 84 which communicates with the upper portion of counting piston cylinder 77. Fluid impelled from escape orifice 84 flows unimpeded into the principal volume of oil in tank 1 through an aperture 85 surrounding tripout stem 79. As a result of the free escape of oil through orifice 84, magnetic plunger 39 can descend comparatively rapidly because it operates against no back pressure. Thus, while the escape orifice 84 is open, the recloser executes fast opening operations.

During one or more fast opening operations, pump piston 50 forces oil underneath integrating piston 78 through ball valve 76 and into cylinder 77. Trip piston 78 is thus elevated from its resting position on stop pin 86 in Fig. 1 to an intermediate position where it blocks off escape orifice 84. After escape orifice 84 is blocked, magnetic plunger 39 descends more slowly or in a retarded manner because it must now operate against a pressure relieved only by inherent leakage and turbulence. Therefore it will be seen that the first operation of plunger 39 will be rapid and subsequent operations will be retarded. When the recloser is operating as in the conventional manner demonstrated by Figs. 1 and 2, four strokes of pump 50 may elevate tripout piston 78 to its position in Fig. 2 where it will cause the recloser to be locked out by stem 79 acting on latch 65.

When magnetic plunger 39 is returning from its lowermost position, see Fig. 2, to its uppermost position as in Fig. 1, it draws oil in cylinder 37 by means of inherent leakage and the flow afforded by small hole 87 in slide valve 82 which pulls down to block escape orifice 84 at this time. Restricting the flow of oil into cylinder 37 during the return stroke of plunger 39 causes the movable recloser contact 26 to dwell momentarily in an open position for the purpose of giving any transient fault on the distribution circuit time to clear itself prior to reclosing of the circuit.

In Figs. 3 and 4 it will be observed that integrating counting piston 78 comprises a lower solid cylindrical section 88 and an upper cylindrical section 89. Lower piston section 88 fits loosely into its cooperating cylinder 77 as does the upper section 89 so that by reason of leakage about their outer peripheries the integrating piston tends to slowly settle unitarily when fluid is not being forced into cylinder 77 by means of pump 50. Upper piston 89 is provided with a plurality of axial holes 90 which are normally closed by a disc valve 91 biased downwardly against the holes by means of a compression spring 92 carried coaxially on a restricted portion of tripout stem 79. When the recloser is executing its first series of rapidly successive opening operations, pump 50 forces oil into integrating piston cylinder 77 and raises integrating piston 78, see Figs. 1 and 2, as a unit with the lower section 88 urged in sealing relation against the upper section 89, thereby closing axial holes 90. Consequently, during the first rapidly successive series of operations, disc valve 91 is inactive, that is, the latter tends to rest in sealing relation on the upper ends of axial holes 90. If repeated operations of the recloser causes pump 50 to elevate trip piston 78 to an intermediate position where tripout stem 79 does not strike trip out latch 65, then the lower section 88 of piston 78 will tend to resettle simultaneously with the upper portion 89 until the piston unit returns to its lowermost settled position against stop pin 86 as in Fig. 1. However, if the recloser operates through its full sequence of operations, such as two fast followed by two retarded operations, the trip stem 79 will be elevated to its uppermost position whereupon it will strike latch 65 and break the toggle 53 as in Fig. 2. This will lock out the recloser and require its manual resetting.

During the interim between lockout and manual resetting, lower piston section 88 will resettle by itself to its lowermost position against stop pin 86 as indicated in Fig. 3. Due to the collapse of toggle 53, however, trip piston retaining arm 58 will swing around in a counter-clockwise position and dispose itself in the path of a buttonhead 93 on trip piston stem 79 as in Figs. 2 and 3. Thus it is seen that during lockout, upper piston section 89 resides in cylinder 77 in a position where it blocks escape orifice 84. Due to the small leakages oil will be replenished between upper and lower sections 89 and 88, respectively, when lower section 88 settles as in Fig. 3. Following manual resetting of the recloser, see Fig. 3, retaining arm 58 will be swung to its solid line position in a clockwise direction clear of the path in which buttonhead 93 of tripout stem 79 resettles. At the same time latch 65 is brought downwardly into proximity with, but not striking buttonhead 93 because the latter settles slightly during lockout until intercepted by arm 58 as indicated by the dashed lines in Fig. 3. Hence, immediately after manual resetting upper piston 89 blocks the slide valve escape orifice 84 as described above and likewise begins settling toward lower piston section 88. Resettling time is controlled by the fit between upper piston 89 and its cooperating cylinder 77 and by selecting the proper compression spring 92 so that it tends to prevent leakage through axial holes 90 under valve disc 91.

With the upper piston section 89 blocking the escape orifice 84, it will be evident that operations of the recloser subsequent to manual resetting will be retarded. This is so because the discharge of fluid from magnetic plunger 39 cannot take place through the escape orifice 84 so the plunger operates against back pressure.

As explained earlier in the specification, after the reclosing circuit interrupter has been locked out for an extended period of time, it is very likely that the load being supplied will have completely lost its diversity. Hence, appliances such as refrigerators, air conditioners, oil burners, etc. which are operated by induction motors will want to commence operation simultaneously, thereby causing a high inrush current which will appear to the recloser as an abnormal or fault current, tending to open the recloser. Since the retardation of the magnetic plunger resulting from blocking escape orifice 84 by upper piston section 89 delays opening of the recloser main contacts 18 and 28 for a period of time during which the inrush current is appreciably decreased, under most conditions the recloser may not open even once. However, if the current inrush is of such magnitude as to exceed the normal tripping current, then the recloser will execute one or more delayed opening operations. The reclosing characteristic of the recloser is such that motors on the line will not lose much of their speed during the reclosing interval. Hence, the inrush current will be gradually diminished, so that the recloser will ultimately remain closed and allow the tripout piston 78 to settle to its normal resting position as in Fig. 1.

If conditions are such that the recloser executes several retarded operations after being manually reset, pump piston 50 will force measured quantities of oil in cylinder 77 underneath the lower piston section 88. In Fig. 4 it will be observed that during the cycle of all retarded operations lower piston section 88 will begin to advance upwardly toward the upper piston section 89. Since there is oil trapped between the upper section 89 and lower piston section 88, it is necessary that the oil be relieved through holes 90 during the retarded operations lest sufficient force be delivered for tripping toggle latch 65. This is accomplished by proper design of the spring 92 and valve disc 91. Their force and weight, respectively, are such as to prevent the lifting of valve disc 91 during resettling yet insufficient to exert adequate force to trip latch 65 in opposition to its latching spring 68. While there is some lifting force on upper section 89 due to trapped oil between the two pistons 89 and 88 it will be insufficient to trip latch 65. After a pre-determined number of retarded operations, lower piston section 88 will strike the bottom of upper piston 89, thereby closing off axial relief holes 90. An additional stroke of pump piston 50 will then raise trip piston 78 as a unit whereupon it will break toggle 53 by striking latch 65 and lock out the recloser described before.

If subsequent to manual resetting the surge current does not exceed the minimum trip current of the recloser, then upper piston section 89 will slowly settle down to its normal position against lower piston section 88 as illustrated in Fig. 1. The recloser will then prepare itself for a normal series of fast and retarded operations.

Figures 5, 6:
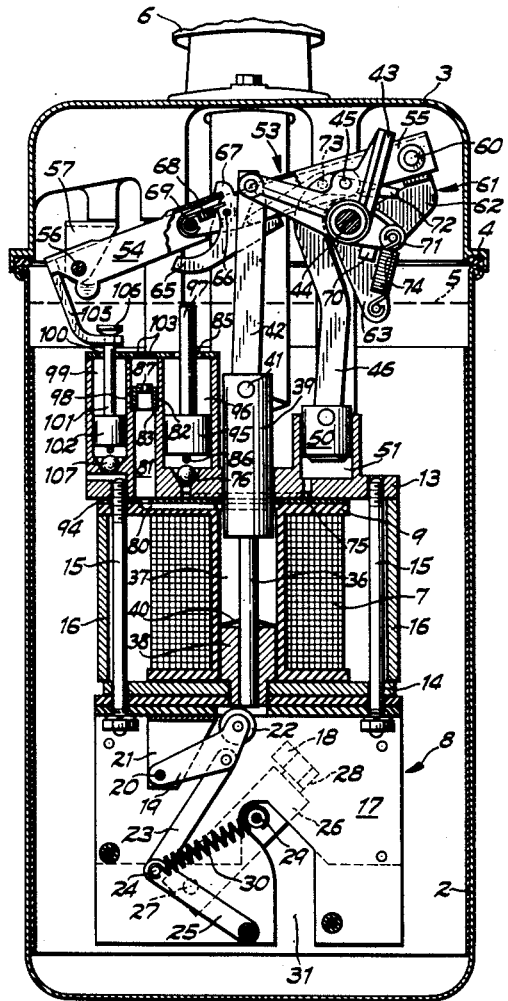
Fig. 5 is a vertical sectional view, with parts broken away, through an alternative embodiment of the circuit interrupter, showing it in closed position.
Fig. 6 is a similar view showing the reclosing circuit interrupter of Fig. 5 after an automatic lockout.

Figs. 5 and 6 represent an alternative embodiment of the invention modified principally insofar as the hydraulic timing mechanism is concerned but adapted to achieve a result similar to that of the embodiment described in connection with Figs. 1–4. Wherever there is a similarity of parts the same reference numerals will be used as in the previous figures.

It will be observed that the same contact structure 8 is adapted to be actuated by a magnetic solenoid plunger 39 through the agency of an extension rod 36 which projects from a cylinder 37 defined by solenoid winding spool 9. Each time solenoid coil 7 is traversed by a certain pre-determined minimum trip current, magnetic plunger 39 is pulled down so that it rocks bell crank 43 and causes pump piston 50 to deliver a definite quantity of oil to a modified trip piston 95 slidable within its separate cylinder 96. Pump piston cylinder 50 communicates directly with the trip piston cylinder 96 by means of an oil passageway 75 including a ball valve 76. Each time magnetic plunger 39 executes a downward stroke from its Fig. 5 to its Fig. 6 position, pump piston 50 delivers a quantity of oil which elevates trip piston 95 one step. The number of such strokes required before a lockout is attained may be varied by controlling the length of trip stem 97. During normal operation, trip piston 95 will be elevated until stem 97 strikes latch 65 and breaks the toggle in a manner similar to that described in connection with the first four figures. The recloser will then lock out as in Fig. 6 and require manual resetting before power will be restored to the circuit protected by the recloser.

Each time magnetic plunger 39 is attracted downwardly by the magnetic field of solenoid coil 7, a certain quantity of oil is forced outwardly from plunger cylinder 37 into a passageway 80 which leads into a slide valve cylinder 81. During the first series of all fast operations prior to lockout, slide valve 82 will be forced upwardly by oil pressure developed by plunger 39. When slide valve 82 is forced upwardly it opens a radial escape orifice 93 and permits flow of fluid from cylinder 81 to an independent delay cylinder 99 adjacent the slide valve cylinder. Oil relieved from escape orifice 98 flows unimpeded through delay piston cylinder 99 and out through a free space 100 surrounding a delay piston stem 101 projecting upwardly from an auxiliary delay piston 102.

Thus it will be seen that the recloser of Figs. 5 and 6 is adapted to execute a first series of all fast operations before trip piston 95 is elevated to a position where it trips lockout latch 65. This is so because slide valve 82 opens relief orifice 98 on each stroke of plunger 39. When plunger 39 returns to its uppermost position as in Fig. 5 under the influence of contact toggle spring 30, slide valve 82 is drawn downwardly. Oil for replenishing that displaced underneath plunger 39 is drawn through a small aperture 87 in the top of the slide valve which receives its supply of oil through a number of smaller holes 103 located in alignment with the top of slide valve cylinder 81. By varying the size of small hole 87 in the slide valve 82 or by adding an auxiliary intake valve, not shown, to the slide valve chamber 81, the return time for the plunger to reach its uppermost position and likewise the reclosing time may be controlled.

In this embodiment of the invention toggle link 54 is provided at its extreme end with a bifurcated arm 105 which normally embraces delay piston stem 101 immediately underneath a buttonhead 106. When integrating piston 95 attains its uppermost position, see Fig. 6, striking latch 65 and causing the toggle links 54 and 55 to break with respect to each other and lock out the recloser, it will be noted that bifurcated arm 105 swings around and engages temporary delay piston 102. When temporary delay piston 102 is engaged as in Fig. 6, oil is drawn into delay piston cylinder 99 through a ball check valve 107. Thus, shortly after the recloser is locked out, a supporting column of oil flows into temporary delay cylinder 99 for supporting delay piston 102 in its upper most position. During the lockout period, integrating piston 95 will, of course, settle to its lowermost position in cylinder 96.

When the recloser is manually reset so that the toggle link mechanism assumes the position illustrated in Fig. 5, bifurcated arm 105 swings clockwise and allows temporary delay piston 102 to begin slowly settling toward its lowermost position. Consequently temporary delay piston 102 will remain for a while in its uppermost position where it blocks escape orifice 98 leading to slide valve cylinder 81. If the inrush current is of such magnitude that the recloser executes an opening operation, the first operation and all succeeding operations following manual resetting will be time delayed or retarded as long as escape orifice 98 is closed by delay piston 102. If there is a permanent fault on the line, the recloser will execute a series of successive retarded operations and then lock out as before. However, if the tendency for the recloser to operate is due primarily to subsiding inrush current, the retardation aids in preventing the recloser from opening. After diminution of the current traversing solenoid coil 7 to normal values, that is, below the minimum trip value of the recloser, temporary delay piston 102 will settle to its lowermost position in cylinder 99, and after settling to a level beneath escape orifice 98, the recloser is virtually restored to its normal operating condition whereupon following operations of the recloser will be fast.

Alternative embodiments of a circuit interrupter have been described in which each has a certain time current characteristic before lockout, and another time current characteristic subsequent to lockout. It will be appreciated that either embodiment of the invention is equally applicable for protecting a power distribution system whether the branch lines thereof are protected by individual fuses or by sectionalizing switches such as those illustrated in the cited Schindler patent. In the first embodiment, where the circuit interrupter executes fast and retarded operations prior to lockout, it is understood that the cause of operation of the interrupter is most likely a fault on one or more branch lines. Hence, the interrupter's time current characteristic is coordinated with that of the fuses in the branch lines during the first series of operations. However, when the interrupter is manually reset after a prolonged lockout, excess current is due not to a fault on a particular branch line, but to the accumulation of inrush currents in each branch line. So immediately after resetting only, the reclosing interrupter is obligated to carry current far in excess of normal, but the fuses do not carry an amount which would tend to melt them. Therefore, there is no problem of coordination with fuses during the second series of all retarded operations following manual resetting.

Where sectionalizing switches are located in the branch lines supplied by the interrupter there is no problem of time current characteristic coordination because such sectionalizers merely count the recloser operations and ultimately lock out during an open period of the recloser.

It is evident in each instance that according to the invention, changing from a series including fast openings to a series consisting entirely in retarded openings is automatic in either of the two embodiments and follows from the simple act of manual reclosing.

Although this invention has been described in considerable detail it is to be understood that such description is intended as illustrative rather than limiting, as the invention may be variously embodied and is to be interpreted as claimed.

It is claimed:

1. A repeating circuit interrupter comprising switch means, electromagnetic hydraulic plunger means opening said switch means on overload, means for closing said switch means following certain in a successive first series of openings, a chamber in communication with said hydraulic plunger means and including an escape orifice for relieving hydraulic fluid displaced by said plunger during at least some of said first series of switch openings, normally inactive lockout means operable to lockout condition after termination of said first series, manual means for restoring said switch to closed position and returning said lockout means to inactive condition following lockout and initiating a second series of switch openings in response to overloads, delay piston means in escape orifice blocking position immediately after return of said lockout means from lockout to normal condition, holding means for said delay piston cooperatively linked to said lockout means, said holding means being inactive during normal condition of said lockout means, and said holding means thereby permitting release of said delay piston means from escape orifice blocking position whereupon said interrupter may repeat said first series of switch openings and closings.

2. A repeating circuit interrupter comprising switch means, electromagnetic hydraulic plunger means opening said switch means on overload, means for closing said switch means following certain in a successive first series of openings, a chamber in communication with said hydraulic plunger means and including an escape orifice for relieving hydraulic fluid displaced by said plunger during at least some of said first series of switch openings, normally inactive lockout means operable to lock out said switch means after termination of said first series, hydraulic pump means operable from said hydraulic plunger means, integrating piston means advanceable in step-by-step manner in response to said pump means for operating said lockout means at the end of said first series, delay piston means in escape orifice blocking position coincident with lockout, manual means for restoring said lockout means to inactive condition and initiating a second series of retarded switch openings in response to overloads, holding means for said delay piston cooperatively linked to said lockout means, said holding means being inactive during normal condition of said lockout means, and said holding means thereby permitting release of said delay piston means from escape orifice blocking position whereupon said interrupter may repeat said first series of switch openings and closings.

3. A repeating circuit interrupter comprising switch means, electromagnetic hydraulic plunger means opening said switch means on overload, means for closing said switch means following certain in a first series including fast openings, a chamber in communication with said hydraulic plunger means and including an escape orifice for relieving hydraulic fluid displaced by said plunger during at least some of said first series of switch openings, toggled lockout means having a latch normally restraining said lockout means in rigid condition and releasable through the agency of said latch to collapsed condition whereupon said switch means is held in open position, integrating means advancing in steps to a final position for releasing said latch and collapsing said lockout means, hydraulic pump means operable from said electromagnetic plunger means for advancing said integrating means, delay piston means restrained in escape orifice blocking position by collapse of said lockout means, holding means for said delay piston cooperatively linked to said lockout means, said holding means being inactive during normal condition of said lockout means, manual means for restoring said lockout means to rigid condition and releasing said delay piston means for the initiation of a second series of retarded switch opening operations while said delay piston means blocks said escape orifice, said delay piston means moving from escape orifice blocking position following release by said holding means, whereupon said interrupter may repeat said first series of switch openings and closings.

4. A repeating circuit interrupter comprising switch means, electromagnetic hydraulic plunger means opening said switch means on overload, means for closing said switch means following certain in a successive first series of switch openings, a chamber in communication with said hydraulic plunger means and including an escape orifice for relieving hydraulic fluid displaced by said plunger during at least some of said first series of switch openings, normally inactive lockout means operable to hold open said switch means at the termination of said first series, independent hydraulic pump means operated from said electromagnetic plunger means, integrating piston means advanceable in response to reciprocations of said pump means from a lowermost position to an intermediate position where it blocks said escape orifice, said lockout means being actuated by said integrating piston means when the latter attains its uppermost position, holding means cooperatively linked to said lockout means for restraining said integrating piston in escape orifice blocking position following lockout, said holding means being inactive during normal condition of said lockout means, manually operated means for restoring said lockout means to normal condition and allowing said integrating piston to return toward lowermost position at the initiation of a second series of switch opening operations retarded by blocking of said escape orifice.

5. A repeating circuit interrupter comprising switch means, electromagnetic hydraulic plunger means opening said switch means on overload, means for closing said switch means following certain in a successive first series of switch openings, a chamber in communication with said hydraulic plunger means and including an escape orifice for relieving hydraulic fluid displaced by said plunger during at least some of said first series of switch openings, normally inactive lockout means operable to hold open said switch means at the termination of said first series, hydraulic pump means operated from said electromagnetic hydraulic plunger means, integrating piston means adapted to be advanced in steps by said pump means for actuation of said lockout means at the termination of said first series, said integrating piston means comprising an upper delay piston section and lower coaxial section movable unitarily during said first series, said upper section blocking the escape orifice during part of its advance in the first series and including normally inactive check valve means, holding means cooperatively linked with said lockout means for restraining said delay piston section in escape orifice blocking position subsequent to lockout, said holding means being inactive during normal condition of said lockout means, manual means operable to restore said lockout means to inactive condition and release said delay piston section, whereupon said interrupter may execute a second series of switch opening operations retarded by blocking of said escape orifice.

6. A repeating circuit interrupter comprising switch means, electromagnetic hydraulic plunger means opening said switch means on overload, means for closing said switch means following certain in a successive first series of switch openings, a chamber in communication with said hydraulic plunger means and including an escape orifice for relieving hydraulic fluid displaced by said plunger during at least some of said first series of switch openings, hydraulic pump means operated from electromagnetic hydraulic plunger means, normally inactive lockout means operable to hold open said switch means at the termination of said first series, integrating piston means adapted to be advanced unitarily in steps by said pump means for actuation of said lockout means, said integrating piston means comprising an upper delay piston section having an aperture therethrough and a coaxial lower piston normally closing said aperture during said first series, check valve means normally biased toward closing said aperture, holding means cooperatively linked to said lockout means for restraining said delay piston section in escape orifice blocking position subsequent to lockout while said lower piston separates from said upper piston, said holding means being inactive during normal condition of said lockout means, manual means operable to restore said lockout means to inactive condition and release said upper delay piston section, whereupon said delay piston may temporarily block said escape orifice for retarding said electromagnetic plunger and said check valve will relieve fluid entrapped between said piston sections.

7. A repeating circuit interrupter comprising switch means, electromagnetic hydraulic plunger means opening said switch means on overload, means for closing said switch means following certain in a successive first series of switch openings, a chamber in communication with said hydraulic plunger means and including an escape orifice for relieving fluid displaced by said hydraulic plunger during said first series of switch openings, pump means actuated from said electromagnetic hydraulic plunger means, trip piston means advanceable in steps to final position by reciprocation of said pump means, lockout means having a latch normally restraining said lockout means in normal condition and releasable by said trip piston means to collapse said lockout means, delay piston means movable to escape orifice blocking position by operation of said lockout means, holding means for said delay piston cooperatively linked to said lockout means, said holding means being inactive during normal condition of said lockout means, manual means for restoring siad lockout means to normal condition and reclosing said switch means, whereupon a second series of electromagnetic plunger means operations will be retarded until said delay piston re-opens said escape orifice.

8. A repeating circuit interrupter comprising switch means, electromagnetic hydraulic plunger means opening said switch means on overload, means for closing said switch means following certain in a successive first series of switch openings, a chamber in communication with said hydraulic plunger means and including an escape orifice for relieving fluid displaced thereby during said first series of switch openings, pump means actuated by said electromagnetic hydraulic plunger means, a trip piston advanceable in steps to a final position by reciprocation of said pump means, an independent delay piston having a cylinder connected to said chamber by said escape orifice, lockout means releasable by said trip piston on termination of said first series of switch openings to move said delay piston into escape orifice blocking position, holding means for said delay piston cooperatively linked to said lockout means, said holding means being inactive during normal condition of said lockout means, manual means for reclosing said switch means through the agency of said lockout means and for initiating a second successive series of retarded switch opening operations, said manual means also releasing said delay piston for opening said escape orifice by slowly settling in said cylinder whereupon said interrupter may repeat said first series of openings.

References Cited in the file of this patent

UNITED STATES PATENTS

| | | |
|---|---|---|
| 2,515,530 | Schindler | July 18, 1950 |
| 2,560,529 | Van Ryan et al. | July 10, 1951 |
| 2,700,081 | Wallace et al. | Jan. 18, 1955 |
| 2,710,895 | Fredrickson | June 14, 1955 |